United States Patent [19]

Cockburn et al.

[11] Patent Number: 4,625,839

[45] Date of Patent: Dec. 2, 1986

[54] OVERHEAD TROLLEY WIRE INSULATED SUPPORT POST

[75] Inventors: James Cockburn, Edinburgh, Scotland; Arthur D. Suddards, Liverpool, England

[73] Assignee: BICC Public Limited Company, London, England

[21] Appl. No.: 683,011

[22] Filed: Dec. 18, 1984

[30] Foreign Application Priority Data

Dec. 19, 1983 [GB] United Kingdom ............... 8333744

[51] Int. Cl.⁴ .................... B60M 1/20; E04H 12/22; H02G 7/20
[52] U.S. Cl. ................................. 191/40; 174/45 R
[58] Field of Search ............. 174/45 R; 191/40, 41, 191/42, 43

[56] References Cited

U.S. PATENT DOCUMENTS

| | | | |
|---|---|---|---|
| 1,786,631 | 12/1930 | Roe | 174/45 R |
| 1,968,868 | 8/1934 | Austin | 174/45 R |

FOREIGN PATENT DOCUMENTS

| | | | |
|---|---|---|---|
| 108775 | 2/1928 | Austria | 191/40 |
| 608282 | 1/1935 | Fed. Rep. of Germany | 191/40 |
| 730412 | 1/1943 | Fed. Rep. of Germany | 191/40 |
| 414083 | 8/1910 | France | 191/40 |
| 795322 | 3/1936 | France | 174/45 R |
| 575153 | 4/1958 | Italy | 191/40 |
| 23040 | of 1906 | United Kingdom | 191/40 |
| 821264 | 10/1959 | United Kingdom | 191/40 |

Primary Examiner—Robert B. Reeves
Assistant Examiner—David F. Hubbuch
Attorney, Agent, or Firm—Buell, Ziesenheim, Beck & Alstadt

[57] ABSTRACT

In an overhead electric traction system for railways, a simple and inexpensive cantilever structural assembly includes a pole (1) comprising a lower part (3), an upper part (4) which is separately formed with respect to and is mounted on the lower part and to which a cantilever structure (21) is attached and, inter-connected between the upper end of the lower part and the lower end of the upper part, a tubular insulator (3) of plastics insulating material. The insulator (3) will withstand any normal mechanical loading to which the pole (1) will be subjected while it is in service and is of such a shape as to provide the necessary minimum creepage path between neighboring ends of the lower part (3) and upper part (4) of the pole.

12 Claims, 4 Drawing Figures

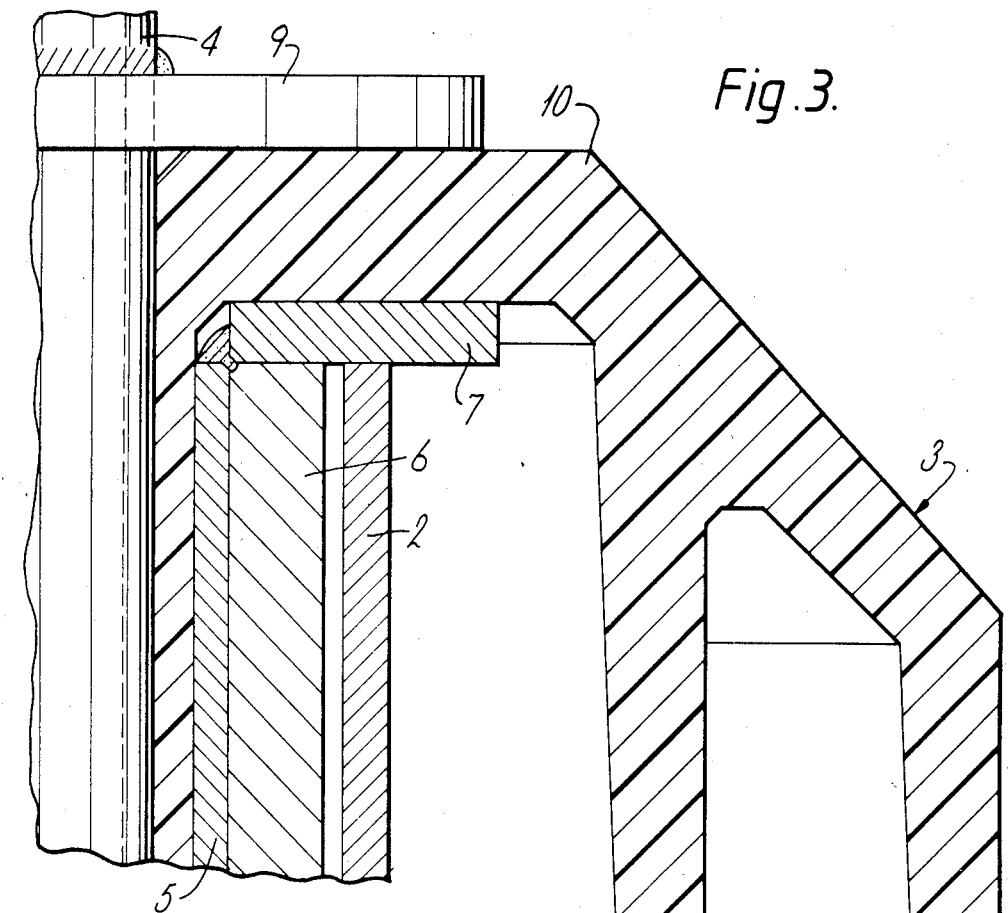
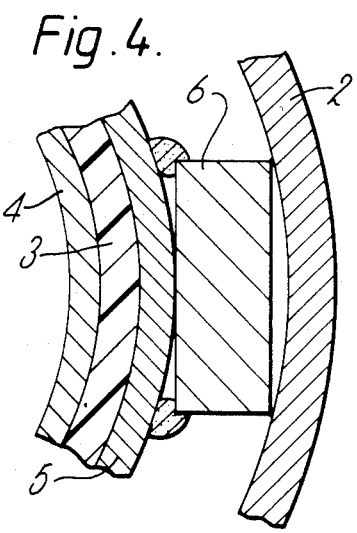

OVERHEAD TROLLEY WIRE INSULATED SUPPORT POST

This invention relates to overhead electric traction systems for railways of the kind in which a contact wire, from which current may be collected by a current collector of the bow or pantograph type mounted on a vehicle, is supported at spaced positions along its length by droppers from a catenary wire which is strung between supporting structures located at spaced positions along the length of the track or which is supported by droppers from an auxiliary catenary suspended from a main catenary wire strung between the supporting structures.

For routes where only a single track or a double track is involved, a form of supporting arrangement in use is a structural assembly comprising a mast or other upstanding support positioned alongside the track and, mounted on an upper part of the upstanding support, a cantilever structure which overhangs the track. The cantilever structure comprises an inclined strut attached at its lower end to the mast or other upstanding support and connected to said upstanding support at its upper end, which lies above the adjoining track, by a substantially horizontally extending elongate member which may be a tie member or a strut member depending upon loading conditions. The catenary, or if main and auxiliary catenaries are used, the main catenary, is attached to the upper end of the inclined strut or to the outer end of the substantially horizontally extending elongate member and the contact wire, or in cases where an auxiliary catenary is used, the contact wire and the auxiliary catenary, is or are each attached to one end of a substantially horizontally extending elongate member, known as a registration arm, the other end of which is attached to the inclined strut or to the mast or other upstanding support. The registration arm has been made of two parts to provide for transverse lateral adjustment of the contact wire relative to the track, for instance for the purpose of staggering the contact wire to reduce localised wear of the current collector. When the mast or other upstanding support is positioned on the outside of a curve, the outer part of the registration arm or the outer registration arm (sometimes referred to as the steady arm) projects from the outer end of the inner part of the registration arm, or from the outer end of the inner registration arm, in the same general direction as the inner part of the registration arm or as the inner registration arm. When the mast or other upstanding support is positioned on the inside of a curve, the inner registration arm is generally longer and projects across the centre line of the track and the outer registration arm or steady arm projects back from the outer end of the inner arm towards the mast or other upstanding support. Structural assemblies of this kind will hereinafter, for convenience, be referred to as "cantilever structural assemblies".

In cantilever structures of cantilever structural assemblies of the kind described hitherto proposed and used, the inclined strut has been formed in part of a metallic member and in part of at least one insulator, such as a petticoated insulator or a resin bonded glass fibre insulator, forming the lower end of the strut and the substantially horizontally extending elongate member connected to the upper end of the elongate strut has been formed in part of a metallic member and in part of at least one insulator, such as a string of two or more strain insulators or a resin bonded glass fibre insulator, the insulator or insulators forming the end of the horizontally extending member nearer the mast or other upstanding support. When an inner end of the registration arm is attached to the inclined strut it has been attached at a position upwardly of the insulator or insulators forming a lower part of the inclined strut. When the inner end of the registration arm is attached to the mast or other upstanding support, the registration arm has included at least one insulator forming a part of the arm nearer the mast or other upstanding support.

Each insulator or string of insulators of each cantilever structure must have a minimum creepage path and the length of the minimum creepage path will depend on the voltage of the overhead electric traction system of which the cantilever structure forms a part. For example, the minimum creepage path may lie in the range 250 to 1600 mm. In addition, each insulator or string of insulators must be capable of withstanding the continuous mechanical loading which, in the case of the insulator or insulators forming part of the inclined strut, can be especially severe. Moreover, the plurality of insulators necessarily provided in each cantilever structural assembly of the system constitutes a substantial proportion of the total cost of each cantilever structure.

It is an object of the present invention to provide an improved cantilever structural assembly of the kind described for use in an overhead electric traction system for railways, which cantilever structural assembly is simple in construction and substantially less expensive than cantilever structural assemblies hitherto proposed and used.

The improved cantilever structural assembly according to the invention includes a pole or other upstanding support structure comprising a lower part, an upper part which is separately formed with respect to and is mounted on the lower part and to which the cantilever structure is attached and, inter-connected between the upper end of the lower part and the lower end of the upper part, at least one insulator which is of such an insulating material that it will withstand any normal mechanical loading to which the upstanding support structure will be subjected whilst it is in service and which is of such a shape as to provide the necessary minimum creepage path between neighbouring ends of the lower and upper parts of the upstanding support structure.

Preferably, one or each of the lower and upper parts of the pole or other upstanding support structure is of metal or metal alloy or of concrete. Preferably, also, where the upstanding support structure is a pole, the lower and upper parts of the pole are elongate members which are in substantially axial alignment.

The insulator or each of the insulators interconnected between the upper end of the lower part of the upstanding support structure and the lower end of the upper part of the upstanding support structure may be a tubular insulator having a plurality of outwardly extending sheds mutually spaced along its length but, for reasons of advantages that will hereinafter be explained, preferably over at least the upper end portion of its length the lower part of the upstanding support structure is of tubular form, the lower end portion of the upper part of the upstanding support structure extends within and along at least part of the length of the upper tubular end portion of the lower part, and a tubular insulator of plastics insulating material is positioned between the upper end portion of the lower part of the upstanding support structure and the lower end portion of the upper part of the upstanding support structure and has, at its upper end, an outwardly extending shed clamped between the uppermost end of the lower part of the upstanding support structure and an outwardly extending shoulder on the upper part of the upstanding support structure.

The tubular plastics insulator may be sandwiched directly between the upper end portion of the lower part of the upstanding support structure and the lower end portion of the upper part of the upstanding support structure but, where the internal diameter of the upper end portion of the lower part and the external diameter of the lower end portion of the upper part are such that the wall thickness of the tubular insulator would be unnecessarily large insofar as its electrically insulating function is concerned, the tubular plastics insulator may be sandwiched between the lower end portion of the upper part of the upstanding support structure and an intermediate metal sleeve clamped in the upper end portion of the lower part of the upstanding support structure; such clamping may be effected by a plurality of circumferentially spaced wedges which are a tight fit between the intermediate metal sleeve and the internal surface of the upper end portion of the lower part. This latter arrangement has the advantage that it permits the use of upper and lower parts of transverse cross-sectional shapes differing from one another.

Preferably, the tubular plastics insulator is closed at its lowermost end by an integral end wall but, where the tubular plastics insulator is open at its lower end, the tubular insulator will extend beyond the lowermost end of the upper part of the upstanding support structure for a sufficient distance to provide the required minimum creepage path between the lower and upper parts of the upstanding support structure.

The outwardly extending shed at the upper end of the tubular plastics insulator preferably has an upper surface which is inclined downwardly and outwardly to encourage dispersal of rain water and, preferably also, has on its undersurface a downwardly extending substantially circular rib or at least two radially spaced downwardly extending substantially circular ribs which provides or provide both the required minimum creepage path and drip points for moisture.

The tubular plastics insulator may be of any suitable plastics material that can be readily moulded to the shape required.

Preferably, the lower part and the upper part of the upstanding support structure are each of tubular form throughout its length and, where the upper part is of tubular form throughout its length, preferably it is closed at its uppermost end to prevent the entry of moisture.

At its uppermost end the lower part of the upstanding support structure preferably has an outwardly extending flange which, in combination with the outwardly extending shoulder on the upper part of the upstanding support structure, constitute bearing plates by means of which any bending moment and direct forces exerted by the upper part of the upstanding support structure are applied through the insulator to the lower part of the upstanding support structure. Where the tubular plastics insulator is sandwiched between the lower end portion of the upper part of the upstanding support structure and an intermediate metal sleeve clamped in the upper end portion of the lower part of the upstanding support structure, preferably the outwardly extending flange at the uppermost end of the lower part is secured to or is an integral part of the intermediate metal sleeve. The tubular plastics insulator positioned between overlapping end portions of the upper and lower parts of the upstanding support structure also resists any bending moment exerted by the upper part of the support structure.

The preferred form of cantilever structural assembly having a tubular plastics insulator positioned between overlapping portions of the upper and lower parts of the upstanding support structure, has the important advantage that the upper part of the support structure can be made of substantially smaller transverse cross-section than the lower part of the support structure. A further advantage arises from the fact that, since the cantilever structure itself does not include any insulators, the fittings attaching the inclined strut and other member or members of the cantilever structure to the upstanding support structure can be of substantially simpler form. Another advantage arises from the fact that the or each insulator incorporated in the upstanding support structure is less vulnerable to damage than an insulator forming part of the cantilever structure.

Where an earth conductor and/or an insulated return conductor is or are to be suspended from upstanding support structures at spaced positions along the length of an overhead electric traction system, these will be supported on an upper portion of the lower part of each support structure at a position a short distance below the lower end of the insulator or insulators.

Where an overhead electric traction system requires an earth conductor and/or an insulated return conductor to be suspended from upstanding support structures at spaced positions along the length of the system at a level above the insulator or insulators, the conductor or conductors will be suspended from upstanding members each of which, at its lower end, is secured to the lower part of an upstanding support structure at a position a short distance below the lower end of the insulator or insulators.

Where it is required to increase the electrical capacity of the overhead electric traction system by the provison of parallel electric conductors or feeders, these feeders will be supported on the upper part of each support structure using insulated fittings of appropriate electrical insulating properties or fittings similar to those by which an earth conductor is suspended from the lower part of each support structure.

In all cases, the lower part of the upstanding support structure and the insulator or insulators mounted on the lower part will be of such a height that the upper part of the support structure is out of normal reach of any person.

The invention is further illustrated by description, by way of example, of a preferred cantilever structural assembly with reference to the accompanying drawings, in which:

FIG. 3 is a part of the fragmental sectional side view of the pole of the cantilever structural assembly shown in FIG. 2, drawn on an enlarged scale;

FIG. 4 is a fragmental cross-sectional view of the pole taken on the line IV—IV in FIG. 2, drawn on an enlarged scale;

Figures 1, 2:
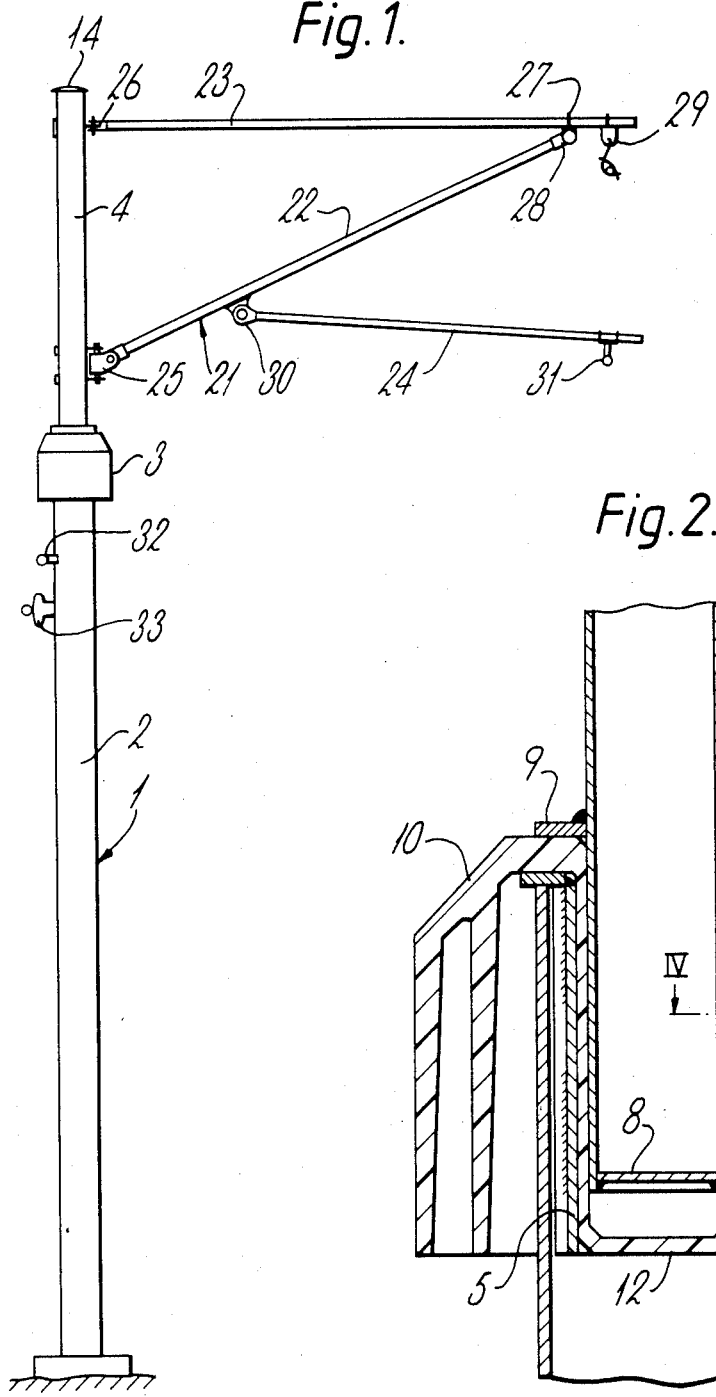
FIG. 1 is an elevation of the cantilever structural assembly.
FIG. 2 is a fragmental sectional side view of the pole of the cantilever structural assembly shown in FIG. 1.

Referring to the drawings, the cantilever structural assembly comprises a pole 1 built up of a lower tubular metal part 2, an upper tubular metal part 4 and, interconnected between and separating the lower and upper parts, a tubular insulator 3 of compressible plastics insulating material. A cantilever structure 21 is pivotally mounted on the upper part 4 of the pole 1.

The internal diameter of the lower tubular metal part 2 is substantially greater than the external diameter of the upper tubular metal part 4. A lower end portion of the upper tubular metal part 4 extends into the upper end portion of the tubular metal part 2 and the tubular plastics insulator 3 is sandwiched between the lower end portion of the upper tubular metal part and an intermediate metal sleeve 5 clamped against the insulator by four circumferentially spaced metal spacing bars 6 which are welded to the sleeve and are a frictional tight fit against the internal surface of the upper end portion of the tubular metal part 2. The lower tubular metal part 2 has at its upper end an outwardly extending flange 7 which is welded to the upper end of the sleeve 5 and the upper tubular metal part 4, which is closed at its lowermost end by a disc 8 welded in the bore of the upper part 4, has spaced from its closed lower end an outwardly extending flange 9.

At its upper end, the tubular plastics insulator 3 has an outwardly extending dish 10 which is sandwiched between the flanges 7 and 9. The upper surface of the outwardly extending dish 10 of the tubular insulator 3 has a downwardly and outwardly extending surface and the undersurface of the dish has two radially spaced downwardly extending substantially circular ribs 11 whose surfaces, together with the upper surface, provide the required minimum creepage path between the lower part 2 and upper part 4 of the pole 1. An integral end wall 12 closes the lowermost end of the tubular insulator 3.

The upper end of the upper tubular metal part 4 is closed by a cap 14.

The principal structural members of the cantilever structure 21 are three metal tubes, one tube constituting an inclined strut 22, a second tube of substantially the same cross-section forming a horizontally extending strut 23 and a third tube of smaller cross-section forming the registration arm 24. Fittings 25 between the lower end of the inclined strut 22 and the upper part 4 of the pole 1 and fittings 26 between the inner end of the horizontally extending strut member 23 and the upper part are each of such a form as to allow for vertical and horizontal movement of their respective struts. A clevis clamp 27, attached to the horizontal strut 23 close to its outer end, is attached by a pin to the clevis side of a tongue and clevis clamp 28 attached to the upper end of the inclined strut 22. A catenary swivel clamp 29 for supporting the catenary is attached to the horizontal strut 23 between the clevis clamp 27 and the outer end of the horizontal strut. The registration arm 24 is attached to the inclined strut 22 by a fitting 30 of such a form that the registration arm can pivot about a horizontal axis. At the outer end of the registration arm 24 is a swivel clip 31 for the contact wire.

Attached to an upper portion of the lower part 2 of the pole 1 immediately below the insulator 3 is a fitting 32 for supporting an earth conductor and, immediately below this fitting, there is provided an insulated fitting 33 for supporting an insulated return conductor.

What we claim as our invention is:

1. For use in supporting a contact wire of an overhead electric traction system for railways, a cantilever structural assembly comprising an upstanding support structure and, mounted on an upper part of the upstanding support structure, a cantilever structure, wherein the upstanding support structure comprises a lower part which over at least the upper end portion of its length is of tubular form, an upper part to which the cantilever structure is attached and which is separately formed with respect to and whose lower end portion extends within and along at least a part of the length of the upper tubular end portion of the lower part and, positioned between the upper end portion of the lower part and the lower end portion of the upper part, a tubular insulator of plastics insulating material having, at its upper end, an outwardly extending shed clamped between the uppermost end of the lower part of the upstanding support structure and an outwardly extending shoulder on the upper part of the upstanding support structure, the plastics insulating material of the insulator being such that it will withstand any normal mechanical loading to which the upstanding support structure will be subjected whilst it is in service and which is of such a shape as to provide the necessary minimum creepage path between neighbouring ends of the lower and upper parts of the upstanding support structure.

2. For use in supporting a contact wire of an overhead electric traction system for railways, a cantilever structural assembly comprising an upstanding support structure and, mounted on an upper part of the upstanding support structure, a cantilever structure, wherein the upstanding support structure comprises a lower part which over at least the upper end portion of its length is of tubular form, an upper part to which the cantilever structure is attached and which is separately formed with respect to the lower part and whose lower end portion extends within and along at least part of the length of the upper tubular end portion of the lower part and, sandwiched between the lower end portion of the upper part and an intermediate metal sleeve clamped in the upper end portion of the lower part, a tubular insulator of plastics insulating material, the plastics insulating material of the insulator being such that it will withstand any normal mechanical loading to which the upstanding support structure will be subjected whilst it is in service and which is of such a shape as to provide the necessary minimum creepage path between neighbouring ends of the lower and upper parts of the upstanding support structure.

3. A cantilever structural assembly as claimed in claim 2, wherein the intermediate metal sleeve is clamped in the upper end portion of the lower part of the upstanding support structure by a plurality of circumferentially spaced wedges which are a tight fit between the intermediate metal sleeve and the internal surface of the upper end portion of the lower part.

4. A cantilever structural assembly as claimed in claim 1 wherein at its uppermost end the lower part of the upstanding support structure has an outwardly extending flange which, in combination with the outwardly extending shoulder on the upper part of the upstanding support structure, constitute bearing plates by means of which any bending moment and direct forces exerted by the upper part of the upstanding support structure are applied through the insulator the lower part of the upstanding support structure.

5. A cantilever support structure as claimed in claim 1, wherein the outwardly extending shed at the upper end of the tubular plastics insulator has an upper surface which is inclined downwardly and outwardly to encourage dispersal of said water and has on its undersurface at least one downwardly extending substantially circular rib.

6. A cantilever structural assembly as claimed in claim 2 or 3, wherein the tubular insulator has, at its upper end, an outwardly extending shed clamped between the uppermost end of the lower part of the upstanding support structure and an outwardly extending shoulder on the upper part of the upstanding support structure, and wherein the uppermost end of the lower part of the upstanding support structure of the intermediate metal sleeve has an outwardly extending flange which, in combination with the outwardly extending shoulder on the upper part of the upstanding support structure, constitute bearing plates by means of which any bending moment and direct forces exerted by the upper part of the upstanding support structure are applied through the insulator to the lower part of the upstanding support structure.

7. A cantilever structural assembly as claimed in any one of claims 1 to 3, wherein the tubular plastics insulator is closed at its lowermost end by an integral end wall.

8. A cantilever structural assembly as claimed in any one of claims 1 to 3, wherein at least one of the lower and upper parts of the upstanding support structure is of metal.

9. A cantilever structural assembly as claimed in any one of claims 1 to 3, wherein the lower and upper parts of the upstanding support structure are elongate members which are in substantially axial alignment.

10. A cantilever structural assembly as claimed in any one of claims 1 to 3, wherein the lower part and the upper part of the upstanding support structure are each of tubular form throughout its length and the upper part is closed at its uppermost end to prevent the entry of moisture.

11. A cantilever support structure as claimed in any one of claims 1 to 3, wherein means is provided for supporting an earth conductor and an insulated return conductor on an upper portion of the lower part of the upstanding support structure at a position a short distance below the lower end of the insulator.

12. A cantilever structural assembly as claimed in any one of claims 1 to 3, wherein at least one of the lower and upper parts of the upstanding support structure is of metal alloy.

* * * * *